G. W. Tucker.
Land Marker.

No. 88,234.      Patented Mar. 23, 1869.

Witnesses:
Geo. A. Read
C. H. Bishop

Inventor:
Geo. W. Tucker
by Prindle and Dyer.

GEORGE W. TUCKER, OF EUGENE, ILLINOIS.

Letters Patent No. 88,234, dated March 23, 1869.

IMPROVEMENT IN CORN-MARKER.

The Schedule referred to in these Letters Patent and making part of the same.

*To all whom it may concern:*

Be it known that I, GEORGE W. TUCKER, of Eugene, in the county of Knox, and in the State of Illinois, have invented an Improved Field, or Corn-Marker; and do hereby declare that the following is a full, clear, and exact description thereof, reference being had to the accompanying drawing, making a part of this specification, in which—

Figure 1:
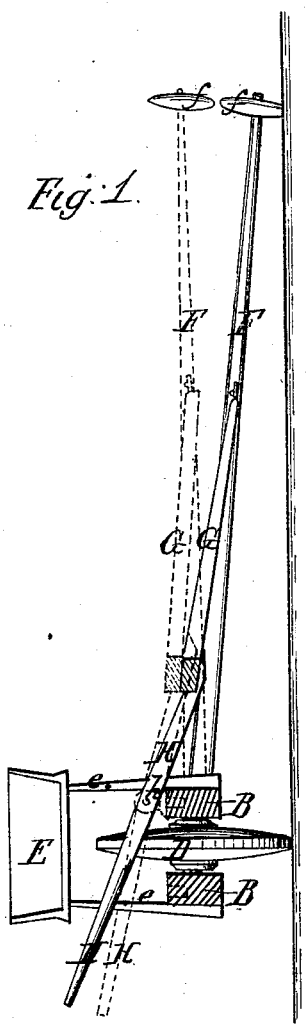
Figure 1:
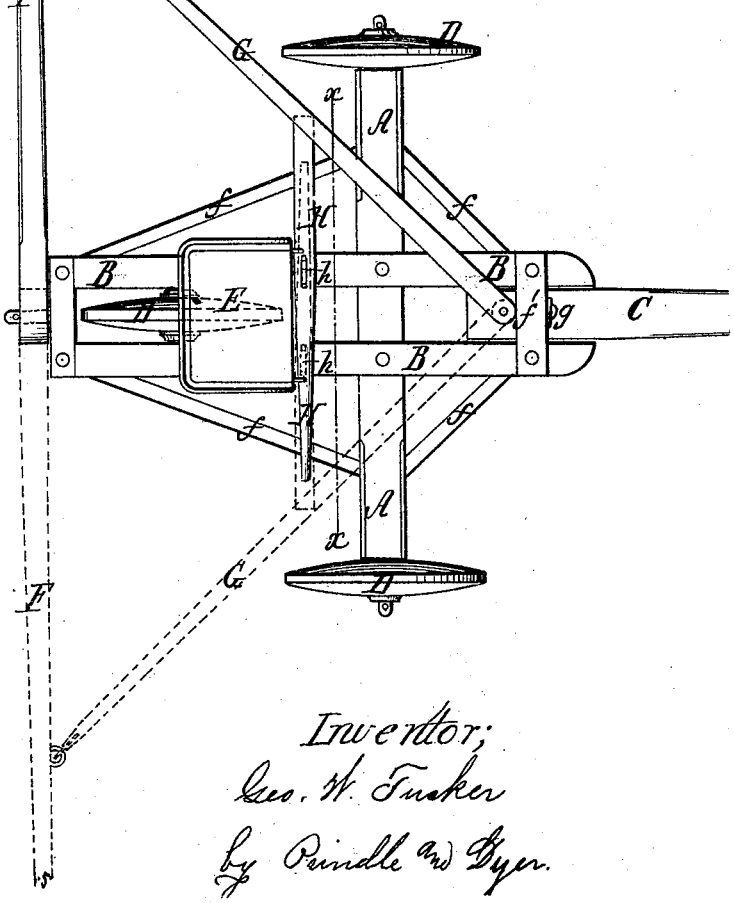

Figure 1 is a plan view of the upper side of a marker, with the gauge attached, and Figure 2 is a vertical cross-section of the same, on the line $x\ x$ of fig. 1.

Letters of like name and kind refer to like parts in each of the figures.

My invention relates to a class of devices known as corn, or field-markers; and

It consists, principally, of a gauge, extending to one side from a marker, to which it is pivoted, so that its outer end is allowed to conform to the undulations of the ground, and which traces a line upon the unmarked field, at the precise point over which the centre wheel of said marker will be required to pass when returning across said field.

It further consists of the construction of the gauge, and its manner of attachment to the marker, so that it can be used upon either side of the latter, and also of the means employed for elevating and suspending said gauge when not desired for use.

In the annexed drawing—

A represents the axle,

B, the frame, and

C, the pole of the marker.

Pivoted upon the ends of the axle, and within the frame, near its rear end, are the marking-wheels D D D, of the usual form.

Four braces, $b\ b$, &c., are secured to the axle, and extend diagonally to the frame, for the purpose of strengthening the latter, while other braces, $e\ e$, &c., extend vertically from said frame, and support, upon their upper ends, a seat, E, for the driver.

F represents a bar, pivoted to the rear end of the frame B, and extending to one side, in a line parallel with the axle A, and having secured to its outer end, in a line parallel with the pole, a cross-piece, $f$, so shaped as to allow either of its edges to pass over and make a mark upon the ground.

One end of a brace, G, is pivoted to a bolt, $g$, passing loosely through a yoke, or tie-piece, $b'$, upon the front end of the frame B, while its other end is secured loosely to the bar F, midway from either end, the whole forming a gauge for tracing a line at the point over which the centre of the marker must pass in returning across the field.

It will be readily seen that this arrangement permits the gauge to be turned from one side to the other, so as to always trace its line upon the unmarked ground, as the marker is driven in opposite directions across the field.

To enable the gauge to be raised and suspended, when not in use, as when turning, or going to or from the field, a lever, H, is pivoted upon the upper end of a bolt, $h$, the lower end of which is stepped in a suitable hole in the frame-timber nearest said gauge.

The lever extends across the frame, directly in front of the driver's seat, so that its outer end may pass beneath the brace G, as seen in fig. 1.

While the gauge is resting upon the ground, the lever occupies the position shown in black in fig. 2, and in order to raise the former, the driver has only to place his foot upon the end of said lever most distant from said gauge, and press down, when both parts will assume the position shown by the red lines in fig. 2.

In order that the gauge may be secured in an elevated position, without attention from the operator, a pin, $x$, is secured to and projects horizontally from one of the front supports of the seat, beneath which the lever may be passed, when sufficiently depressed, and is there securely held, and the said gauge suspended above the ground until said lever is released.

When the gauge is turned to the opposite side of the marker, the lever may also be reversed, and its fulcrum stepped in a hole in the opposite frame-timber, as shown by the red lines in fig. 1.

The operation of this device will be readily understood.

The operator sets his stakes for the first marks, and drives across the field by them, the gauge being turned out into the field, so as to make a line upon the plowed ground.

When the end of the field is reached, he raises the gauge, by pressing down and securing the lever, steps forward upon the frame until the rear wheel is raised from the ground, and then turns his machine around, so as to bring the pole in a line with and directly over the mark made by the gauge.

He now reverses the gauge and lever, and starts across the field, guiding the marker by the aforesaid line, or mark, and can repeat the operation until the entire field is accurately laid out, without other employment of stakes than, as before mentioned, in running his first line.

The advantages possessed by this device, over any in use intended for a like purpose, are that it is more simple, effective, and durable, and can be furnished at a much lower cost.

Having thus fully set forth the nature and merits of my invention,

What I claim as new, is—

The within-described gauge, consisting of the bar F, marker $f$, and brace G, secured to and in combination with the field-marker, and operated by means of the lever H, substantially as and for the purpose shown.

Also, the combined field-marker and gauge, consisting of the axle A, frame B B, pole C, marking-wheels D D D, bar F, marker $f$, brace G, and lever H, all constructed and arranged to operate substantially as described, and for the purpose set forth.

Also, in combination with the gauge, as described, the reversible lever H, by means of which said gauge is raised or lowered, substantially as herein specified.

In testimony that I claim the foregoing, I have hereunto set my hand, this 23d day of January, 1869.

GEO. W. TUCKER.

Witnesses:
F. WILLIS KEENE,
BENJA. B. BOLT.